Feb. 8, 1966 J. B. McCORMICK 3,233,975
PROTHROMBIN REACTION CHAMBER
Filed March 5, 1962
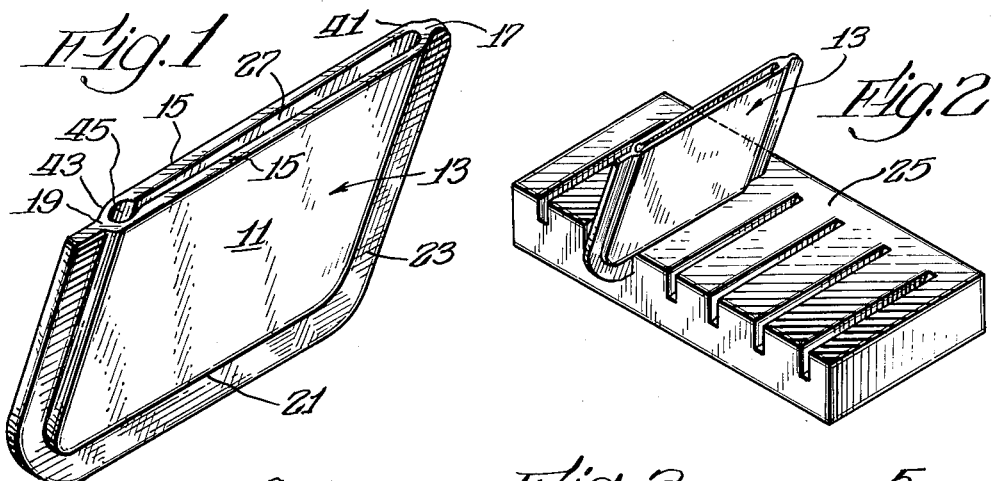
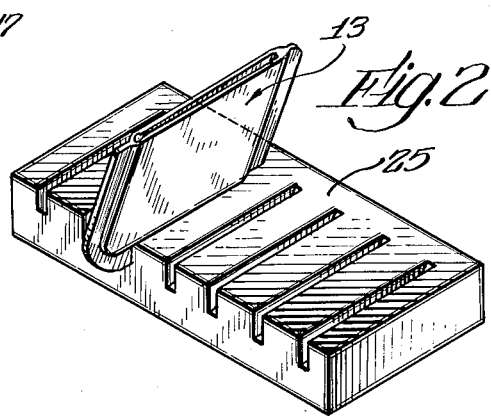
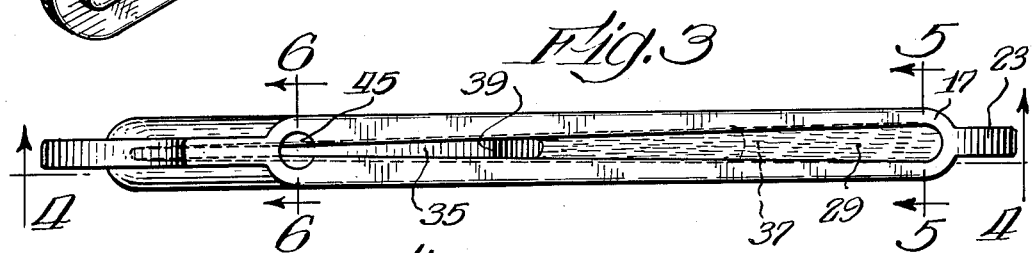
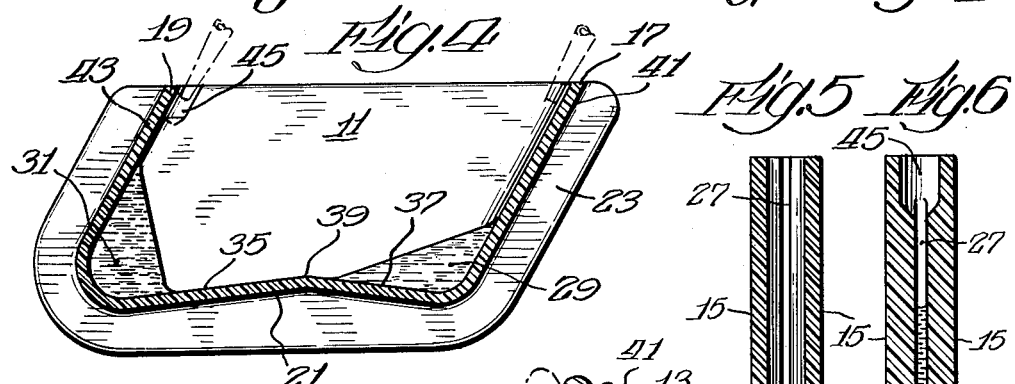
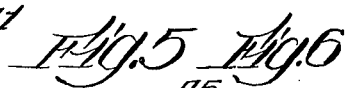
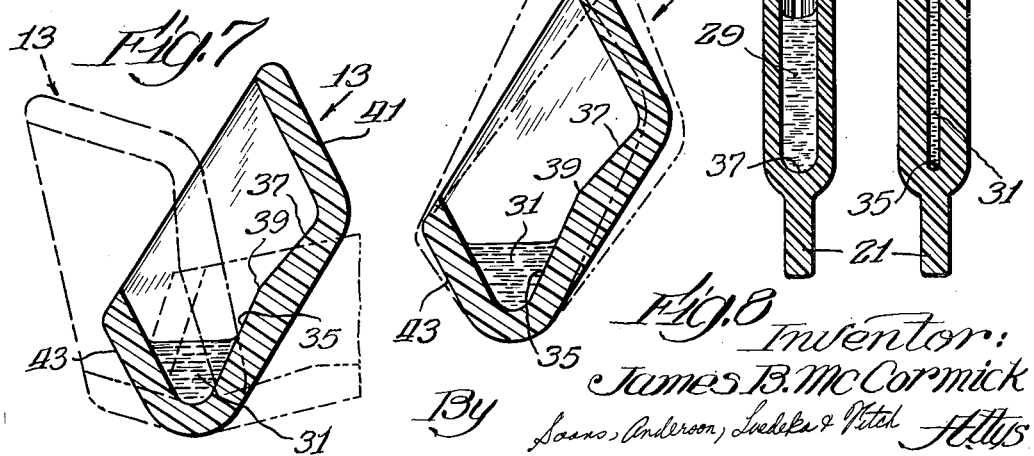
Inventor:
James B. McCormick
By Soans, Anderson, Luedeka & Fitch Attys United States Patent Office 3,233,975
Patented Feb. 8, 1966

3,233,975
PROTHROMBIN REACTION CHAMBER
James B. McCormick, La Grange, Ill., assignor, by mesne assignments, to Ames Lab-Tek, Inc., a corporation of Massachusetts
Filed Mar. 5, 1962, Ser. No. 177,341
8 Claims. (Cl. 23—259)

The present invention generally relates to liquid reaction chambers and more particularly relates to a micro-chamber for mixing together and reacting small quantities of liquids as, for example, in carrying out medical tests such as blood clotting time tests.

A large number of types of medical tests are carried out by trained medical laboratory personnel. Such tests must be performed accurately and reproducibly with a minimum amount of error, particularly since such tests are used as aids in diagnosing and treating medical ailments.

To aid laboratory personnel in performing such tests accurately on a large number of samples in a relatively short period of time, auxiliary equipment, some of which is relatively expensive, is frequently used. Moreover, most of such tests are performed on a macro basis and, accordingly, may require considerable quantities of reactants. For these and other reasons, many medical tests are relatively expensive.

Various improvements have been made in some medical tests to simplify them, minimize possible sources of errors and to lower their cost. Thus, some medical tests are now performed accurately and inexpensively on a micro basis.

However, some types of medical tests have been relatively difficult to perform accurately and economically either on a macro or on a micro basis. In this regard, difficulties are sometimes encountered in performing tests which require relatively rapid but thorough mixing of liquid reactants to provide a clearly defined starting point for the reaction and which also require accurate measurement of the lapsed time of the reaction to a clearly defined end point.

One such type of test comprises the blood prothrombin time test, that is, the measurement of the rate at which blood clots. A characteristic procedure for such test comprises intimately contacting decalcified oxalated blood with a liquid mixture containing a calcium salt and thromboplastin. In that procedure, the reactants must be rapidly and thoroughly mixed together to establish an accurate reaction starting point and the time required to clot the blood must be accurately measured. Ordinarily, the test is carried out on a macro basis, requiring considerable quantities of reactants, including blood. Moreover, to assure uniform mixing of reactants, laboratory personnel characteristically employ auxiliary mechanical mixing equipment. Such requirements tend to keep the cost of the test relatively high.

Although suitable inexpensive and simplified equipment has been devised whereby diabetic patients can carry out insulin tests on themselves to regulate dosages of self-administered insulin, comparable equipment has not been available for carrying out prothrombin time determinations.

A simplified inexpensive liquid reaction chamber has now been discovered which permits rapid and complete mixing and reacting of small quantities of liquids together, merely by hand manipulation of the chamber, and which is particularly adapted for use in micro-determinations of prothrombin times by laboratory personnel and patients on small quantities of blood, such as may be obtained from a pin prick. The chamber is constructed so as to be easily manipulated in one hand while a stop watch is operated in the other hand to measure the blood clotting time. Hand shaking of the chamber according to an easily learned pattern is sufficient to provide complete mixing of the reactants. Moreover, the chamber is constructed to facilitate easy observation of a clear starting point for the reaction and a clear end point and to facilitate the production of the latter.

Accordingly, it is a principal object of the present invention to provide an improved chamber for mixing and reacting liquids. It is also an object of the present invention to provide a simple, inexpensive reaction chamber for intimately hand mixing and reacting small quantities of liquids. It is a further object of the present invention to provide a micro-reaction chamber which is adapted for use in carrying out medical tests, for example, prothrombin time (blood-clotting time) tests. It is a still further object of the present invention to provide a micro-reaction chamber which is constructed so as to facilitate thorough mixing of liquid reactants by simple hand agitation of the chamber and easy observation of clear reaction starting and end points.

Further objects and advantages of the present invention will be apparent from a study of the following detailed description and the accompanying drawings of which:

FIGURE 1 is a perspective view of a preferred embodiment of the micro-reaction chamber of the present invention;

FIGURE 2 is a perspective view of the micro-reaction chamber of FIGURE 1 in place in a warming block;

FIGURE 3 is an enlarged plan view of the reaction chamber of FIGURE 1;

FIGURE 4 is a view taken along the section line 4—4 of FIGURE 3, illustrating the relative position of liquid reactants within the micro-reaction chamber before agitation and mixing thereof;

FIGURE 5 is a view taken along the section line 5—5 of FIGURE 3 illustrating the broad end of the liquid-containing cavity within the reaction chamber;

FIGURE 6 is a view taken along the section line 6—6 of FIGURE 3 illustrating the narrow capillary end of the liquid-containing cavity of the reaction chamber;

FIGURE 7 is an illustration of the reaction chamber of FIGURE 1 tilted first to a 45° angle and, as indicated in dotted outline, rocked through an angle of 90° in order to initiate mixing of liquid reactants therein; and, FIGURE 8 is an illustration of the reaction chamber of FIGURE 1 rocked about a 45° angle to facilitate continued mixing of liquid reactants during the course of a test.

The present invention generally comprises a type of reaction chamber which facilitates rapid and thorough mixing together of small quantities of liquid reactants. More particularly, the improved micro-reaction chamber is constructed to provide two interconnecting liquid-receiving pockets, one of which has sufficiently narrow sides so as to have capillary action. Such latter pocket is preferably constructed so that the portions of the end wall and base of the chamber defining it form an acute angle. This arrangement facilitates rapid intimate mixing of liquids in the pocket, as hereinafter more particularly described.

Now referring more particularly to FIGURE 1 of the accompanying drawings, a preferred embodiment of the micro-reaction chamber 11 of the present invention is illustrated. The micro-reaction chamber 11 is relatively thin and is generally rhomboidal in outline, as shown in FIGURE 4, although it will be understood that it can be trapezoidal or of other desired shape. Chamber 11 comprises a main body 13 formed of interconnected sidewalls 15, rounded end walls 17 and 19 and a base 21, and a thin flange 23 extending peripherally of the body from the end walls 17 and 19 and base 21. Flange 23 is both decorative and functional, acting as a finger grip for handling the chamber 11, and also allowing the chamber 11 to be readily vertically supported in a warming block 25, as shown in FIGURE 2, before use in a medical test. It will be understood that the flange 23 is desirable but not essential to the construction of the chamber 11. Chamber 11 is also provided with an open-topped specially-shaped cavity 27, as shown in FIGURES 1 and 4, and hereinafter more particularly described.

Chamber 11 is preferably of relatively small size so as to be capable of being hand manipulated. For example, a typical micro-reaction chamber suitable for use in carrying out prothrombin time tests may have the following approximate dimensions: 2 inch length; 1 inch height; ⅛ inch overall thickness.

Chamber 11 can be constructed of any suitable material, such as metal, wood, glass, etc., which is relatively inert to the liquid reactants to be utilized therewith. However, it is desirable that the chamber be constructed of a light weight, inexpensive plastic, preferably polystyrene. Other transparent thermoplastic materials can also be used, such as methyl methacrylate, rigid polyethylene and polyvinyl chloride. It will be understood that, generally, transparency of the chamber 11 is desired so that the reactions carried on therein can be easily observed.

The chamber can be cast, molded, pressed or otherwise fabricated, depending upon the particular materials used in constructing the chamber. In the case of polystyrene, chamber 11 can be easily molded to the preferred shape.

Cavity 27 extends from the top of the chamber 11 to adjacent the bottom thereof and includes two interconnecting specially shaped liquid-receiving pockets 29 and 31, respectively, adjacent the lower end thereof, which pockets are separated from one another by a raised portion of the base 21 intermediate the ends thereof. Thus, as shown in FIGURE 4, base 21 may be triangular in cross section, with the two sides 35 and 37 of the triangle defining the bottom of cavity 27 and sloping downwardly from a peak to points of interconnection with end walls 19 and 17, respectively. The apex 39 of the triangle divides the cavity into pockets 29 and 31. The upper sloping surfaces of sides 35 and 37 facilitate transfer of liquid reactants between pockets 29 and 31.

Viewed from above, as shown in FIGURE 3, cavity 27 gradually narrows from the relatively wide portion containing pocket 29 at the end 41 of the chamber adjoining end wall 17 to a relatively narrow portion containing pocket 31 adjoining end wall 19 at the opposite end 43 of the chamber 11. The sidewalls 15 defining pocket 31 are sufficiently close together to provide pocket 31 with capillary attraction for liquids. The described overall shape of the cavity 27 facilitates mixing of liquid reactants transferred from pocket 29 to 31, as by tilting chamber 11 to the position shown in FIGURE 7. Thus, the motion of liquid reactants rolling downhill at an angle from the wide end of chamber 11 (pocket 29) towards the narrow end (pocket 31) during such tilting tends to fold particles entrained in the reactants and the liquid reactants themselves inwardly and upwardly in pocket 31 for intimate mixing of reactants in pocket 31.

Such intimate mixing is further facilitated by the particular shape of pocket 31. Thus, liquid in pocket 31 tends to be capillarily attracted up end wall 19 forming the end of pocket 31, as shown in FIGURE 4, so as to present to liquid passing to pocket 31 from pocket 29 a relatively long contact area for rapid intimate mixing.

Furthermore, end wall 19 is slanted at an angle from the vertical, as shown in FIGURE 4, and is curved adjacent the bottom end thereof where it joins section 35 of base 21 to form an acute angle therewith, providing pocket 31 with additional means for thorough mixing of liquids therein. In this regard, as liquid reactants pass into pocket 31 during the described tilting of chamber 11 to the position shown in FIGURE 7, such liquid reactants are thrust into a back swirl by contact with the acute angle of pocket 31. Paths of rapid circulation of reactants are thereby established in pocket 31 to augment rapid and complete mixing of reactants therein. The net effect is to produce a relatively sharp and accurately determinable starting point for the reaction carried out in pocket 31.

Complete mixing in pocket 31 is preferably initiated by tilting chamber 11 to the 45° angle shown in FIGURE 7, and then rocking the chamber over a 90° angle about the tilted position (45° angle), for four or five times. Complete mixing in pocket 31 is preferably maintained throughout the reaction by gently rocking chamber 11 over an angle of 10–15° from the tilted (45° angle) position, as shown in FIGURE 8.

The production of a sharp, easily observable end point for the reaction in pocket 31, as for example blood clotting, where such end point involves solidification of components in the reaction mixture or a substantial increase in viscosity thereof, is facilitated by the shape of pocket 31. Thus, the capillary attraction exhibited by pocket 31 for liquids helps to slow the motion of the rocking liquid reaction mixture as it increases in viscosity and allows easier observation of visible solids formation therein, for example blood clot formation.

For convenience in introducing liquid into pocket 31, the cavity 27 is preferably provided with an expanded recess 45 communicating with pocket 31 and adapted to receive the end, of for example, a liquid-transferring pipette, as shown in dotted outline in FIGURE 4. Preferably, pocket 29 is sufficiently wide to obviate the use of a special pipette-receiving recess.

Referring more particularly to pocket 29 as illustrated in FIGURE 4, end wall 17 of chamber 11 is preferably slanted at an angle from the vertical so as to be parallel with end wall 19 and so as to form with side 37 of base 21 an obtuse angle in pocket 29. Accordingly, pocket 29 may be adapted to accommodate an appreciable portion of liquid reactant, and to facilitate liquid transfer to pocket 31. However, it will be understood that, for the purposes of the present invention, end wall 17 may be vertical or even may be slanted toward end wall 19 so that pocket 29 may be of another shape than shown in FIGURE 4 and cavity 27 can be generally trapezoidal or of a different configuration.

The following example further illustrates certain features of the present invention:

*Example*

A micro-reaction chamber, approximately 2 inches long, 1 inch high and of ⅛ inch average thickness, molded of transparent polystyrene plastic in the form and shape generally as set forth in the accompanying drawings is utilized in carrying out a micro-prothrombin time test according to the following procedure:

Venous capillary blood from a finger tip is oxalated with 1 volume (per 9 volumes of blood) of a 0.1 aqueous solution of sodium oxalate. The sample is then centrifuged and decanted to separate out calcium therefrom. A 0.04 ml. amount of the oxalated sample is then pipetted into pocket 31 of the reaction chamber in warming block 25, which chamber has been warmed to 37° C. About 0.08 ml. of an aqueous mixture of thromboplastin (obtained from fresh rabbit brain) and calcium chloride is then pipetted into pocket 29. Both the sample and the thromboplastin-calcium chloride mixture rapidly adjust to 37° C. by drawing heat from the chamber walls. The chamber is then removed from the warming block, held in one hand and tilted 45° to the posittion shown in FIGURE 7, a stop watch being started with the other hand the instant the thromboplastin-calcium chloride mixture meets the sample. The chamber is then rapidly rocked through a 90° angle, as shown in FIGURE 7, for a total of 5 times and thereafter is gently rocked, as shown in FIGURE 8, through a 12° angle continuously during the reaction. The mixture is visually observed for the moment when the movement of the mixture stops (due to the formation of a blood clot) or when a sudden change in the motion pattern occurs, also indicating blood clot formation. At such instant, the watch is stopped and the test is over. The total lapsed time is then recorded as the prothrombin time. The reaction chamber is then discarded or washed for reuse.

Relatively sharp starting and end points are demonstrable for the liquid reactions carried out in the described reaction chamber. Accordingly, blood prothrombin times determined therein are accurate and reproducible.

Moreover, it is simple to learn and to physiologically coordinate requisite movements of the hands (starting and stopping the stop watch, tilting and rocking the chamber) in carrying out the indicated simple test procedure. This also tends to increase the accuracy and reproducibility of the test, even when conducted by relatively unskilled personnel, and to lower the cost of the test. Moreover, the micro-reaction chamber is light, small, inexpensive, utilizing small amounts of reactants, so as to further lower the costs of tests conducted therein. The chamber allows rapid and complete mixing of liquid reactants therein merely by hand shaking, thus obviating the use of expensive auxiliary equipment. Other advantages are as set forth in the foregoing.

Various of the features of the present invention are set forth in the appended claims.

What is claimed is:

1. A micro chamber for mixing and reacting small quantities of liquids, said chamber comprising substantially flat closely spaced side walls formed of a transparent material, narrow end walls and a narrow base wall defining a flat open-topped cavity of narrow width, said base including an elevated portion intermediate the ends thereof dividing said cavity into interconnecting first and second liquid-receiving pockets, said side walls being spaced more closely at that end of said cavity which is adjacent said second liquid-receiving pocket than at the end adjacent said first liquid-receiving pocket so as to cause said side walls to converge gradually from the end wall adjacent said first pocket to the end wall adjacent said second pocket.

2. A micro chamber for mixing and reacting small quantities of liquids, said chamber comprising substantially flat closely spaced side walls formed of a transparent material, narrow end walls and a narrow base wall defining a flat open-topped cavity of narrow width, said base wall including an elevated portion intermediate the ends thereof dividing said cavity into interconnecting first and second liquid-receiving pockets, said side walls being spaced more closely at that end of said cavity which is adjacent said second liquid-receiving pocket than at the end adjacent said first liquid-receiving pocket so as to cause said side walls to converge gradually from the end wall adjacent said first pocket to the end wall adjacent said second pocket, said end wall defining said second pocket forming an acute angle with the adjacent portion of said base.

3. A micro chamber for mixing and reacting small quantities of liquids, said chamber comprising substantially flat closely spaced side walls formed of a transparent material, narrow end walls and a narrow base wall defining a flat open-topped cavity of narrow width, said base including an elevated portion intermediate the ends thereof dividing said cavity into interconnecting first and second liquid-receiving pockets, said side walls being spaced more closely at that end of said cavity which is adjacent said second liquid-receiving pocket than at the end adjacent said first liquid-receiving pocket so as to cause said side walls to converge gradually from the end wall adjacent said first pocket to the end wall adjacent said second pocket, said end wall defining said second pocket forming an acute angle with the adjacent portion of said base and said end wall defining said first pocket forming an obtuse angle with the adjacent portion of said base.

4. The micro chamber of claim 3 wherein said chamber is generally thin and rhomboidal in outline and wherein the bottom of said cavity is defined by two base sections sloping downwardly to points of interconnection with said end walls.

5. The micro chamber of claim 4 wherein said sidewalls define a recess at the upper end of said cavity above and in communication with said second pocket and adapted to receive the end of a liquid-transferring pipette.

6. The micro-chamber of claim 5 wherein said end walls are provided with flanges adapted to act as finger grips.

7. The micro chamber of claim 6 wherein said base is also provided with a flange adapted to act as a finger grip.

8. A micro chamber for mixing and reacting small quantities of liquids, said chamber comprising substantially flat side walls formed of a transparent material, narrow end walls and a narrow base wall defining a flat open-topped cavity, said base wall including an elevated portion intermediate the ends thereof dividing said cavity into two interconnecting liquid-receiving pockets, said side walls being sufficiently closely spaced from each other to provide a liquid-receiving pocket in which capillary forces cause liquid contained therein to rise substantially upwardly from said base wall in said liquid-receiving pocket along said side walls and said end wall to a position above said elevated portion of said base wall.

References Cited by the Examiner

UNITED STATES PATENTS 2,279,121   4/1942   Kistler _____ 23—253 X

FOREIGN PATENTS 34,023   12/1885   Germany.

OTHER REFERENCES

German printed application, Hofmann H153041X/42L, Oct. 11, 1956.

MORRIS O. WOLK, *Primary Examiner.*

JAMES H. TAYMAN, JR., *Examiner.*